No. 877,470. PATENTED JAN. 21, 1908.
C. L. FERRIOTT.
COTTON CHOPPER OR CULTIVATOR.
APPLICATION FILED JULY 8, 1907.
2 SHEETS—SHEET 1.
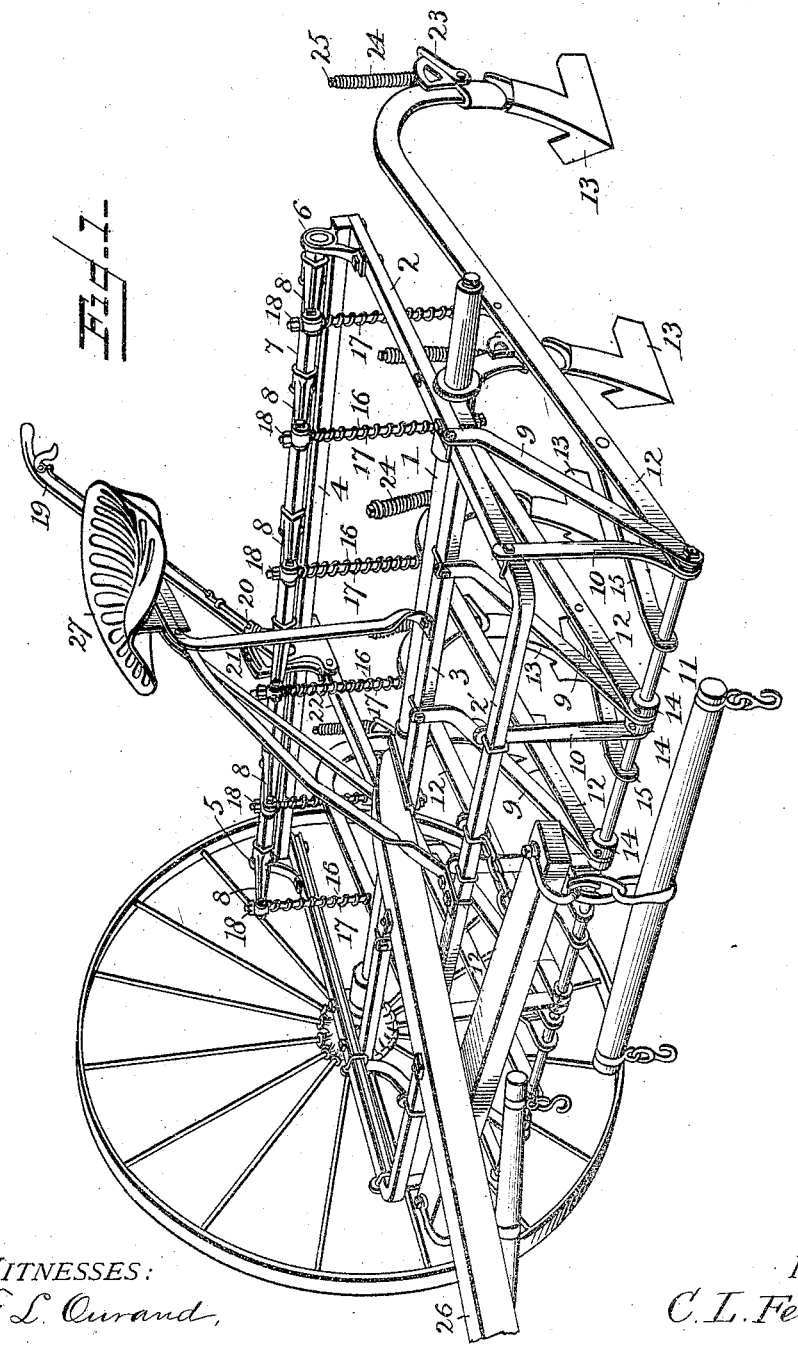
WITNESSES:
F. L. Ourand,
C. Ellentor
INVENTOR
C. L. Ferriott
by H. B. Willson & Co.
Attorneys

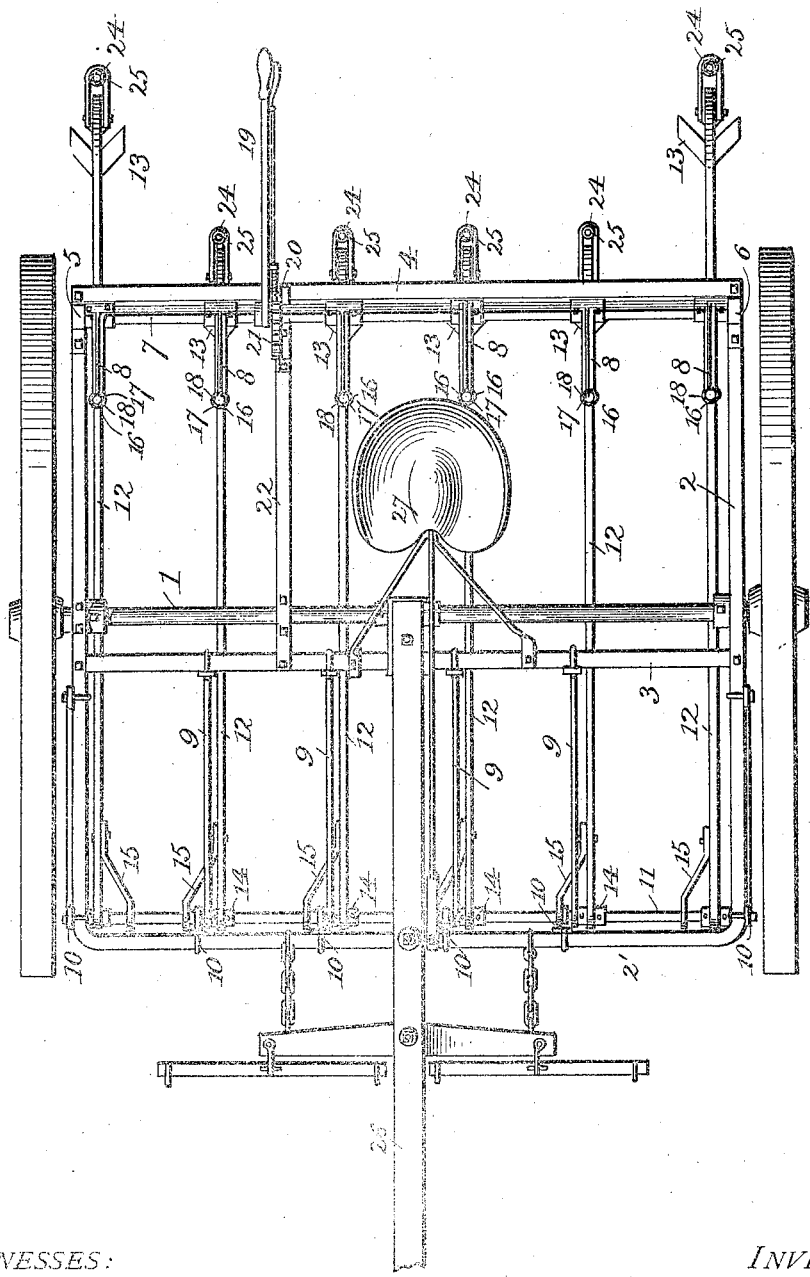

UNITED STATES PATENT OFFICE.

CHARLES L. FERRIOTT, OF TEMPLE, TEXAS, ASSIGNOR TO TEMPLE COTTON CHOPPING MACHINE COMPANY.

COTTON CHOPPER OR CULTIVATOR.

No. 877,470.   Specification of Letters Patent.   Patented Jan. 21, 1908.

Application filed July 8, 1907. Serial No. 382,700.

*To all whom it may concern:*

Be it known that I, CHARLES L. FERRIOTT, a citizen of the United States, residing at Temple, in the county of Bell and State of Texas, have invented certain new and useful Improvements in Cotton Choppers or Cultivators; and I do declare the following to be a full, clear, and exact description of the invention, such as will enable others skilled in the art to which it appertains to make and use the same.

This invention relates to an improved cotton chopper or cultivator designed to be drawn across the rows and leave the cotton after its passage thereover in small hills.

The object of the invention is to provide a simple and efficient cotton chopper in which the shovels are yieldingly mounted and laterally adjustable.

In the accompanying drawings, Figure 1 represents a perspective view of this improved cultivator with the near wheel removed; and Figure 2 represents a top plan view thereof.

In the embodiment illustrated, the machine is shown mounted on two wheels on the axle 1, of which is pivotally mounted an approximately U-shaped frame 2 with its side bars or legs connected near the middle thereof by a transverse bar 3 and with its free ends connected by a bar 4. Supported in brackets 5 and 6 arranged on the bar 4 and the side members of the U-shaped frame 2 is a rock-shaft 7 having laterally-extending spaced arms as 8, for a purpose hereinafter described.

Fixed to the bar 3 are forwardly-extending hangers as 9 and brackets or hangers as 10 depend from the cross-bar 2' of the U-shaped frame 2. A rod 11 is mounted in said hangers and brackets, and pivotally connected at one end with said rod are laterally adjustable beams as 12 having shovels as 13 at their down-turned free rear ends. These beams 12 have collars as 14 arranged on opposite sides thereof and provided with set screws to hold the beams in adjusted position on the rod 11.

Braces as 15 are secured at one end to the beams 12 and at their other ends are provided with apertures through which the rod 11 extends. Extending upwardly from the rear ends of the beams as 12 and passing through apertures in the free ends of the arms 8 of the rock-shaft 17 are rods as 16 on which are disposed coiled springs as 17 whereby the beams are yieldingly mounted to provide for uneven places or stones in the ground being cultivated.

Nuts as 18 are secured to the upper ends of these rods 16 whereby the tension of the springs may be regulated. A lever 19 is fixed to the rock-shaft 7 and is provided with a spring-pressed pawl or tooth 20 which engages a segmental rack 21 mounted on the frame 2 preferably on a bar 22 arranged between the cross-bars 3 and 4. This lever may be adjusted at any desired height to raise the shovels out of the ground or to regulate the depth to which they shall extend into the ground.

Disposed at the rear end of each of the beams as 12 is an upwardly projecting stud as 23 having a spring 24 arranged thereon, the tension of which is regulated by a nut 25.

A tongue 26 is secured to the frame preferably to the cross-bars 2' and 4 and a seat 27 is also mounted on said frame.

I claim as my invention:—

1. In a wheeled cultivator, the combination of a supporting frame, a rock shaft mounted thereon and having laterally extending spaced arms, means for locking said rock shaft in adjusted position, hangers carried by said frame, a rod mounted in said hangers, a plurality of plow beams pivotally mounted at one end on said rod and severally adjustable upon its length and having shovels on the other ends thereof, and yielding means connecting said beams with the arms of said rock shaft.

2. In a wheeled cultivator, the combination of a supporting frame, a rock shaft mounted thereon and having laterally extending spaced arms, means for locking said rock-shaft in adjusted position, hangers carried by said frame at the front end thereof, a rod mounted in said hangers, a plurality of plow beams pivotally mounted at one end on said rod, and laterally adjustable thereon and having shovels on the other ends thereof, rods projecting upwardly from said beams and slidably connected with the arms of said rock-shaft and coiled springs arranged on said rods between said beams and arms.

3. In a wheeled cultivator, the combination of a supporting frame, a rock-shaft mounted thereon and having laterally-extending spaced arms, means for locking said rock-shaft in adjusted position, a rod supported in a plane below said frame at the front of the cultivator, plow beams pivotally mounted on said rod, extending rearwardly and upwardly therefrom and having upwardly-extending studs on their rear ends, coiled springs disposed on said studs and yielding means connecting said beams with the arms of said rock-shaft.

4. In a wheeled cultivator, the combination of an approximately rectangular supporting frame, a rock-shaft mounted transversely thereof, at the rear end of said frame and having laterally-extending spaced arms, a transversely arranged rod supported at the front of said cultivator in a plane below said frame, plow beams adjustably mounted at one end on said rod, yielding means connecting the free ends of said beams with the arms of said rock-shaft, a lever connected with said rock-shaft for simultaneously raising and lowering the plow beams, and bars bracing said beams upon said rod.

In testimony whereof I have hereunto set my hand in presence of two subscribing witnesses.

CHARLES L. FERRIOTT.

Witnessess:
E. F. LANHAM.
H. K. ORGAIN.